United States Patent [19]
Tanaka et al.

[11] Patent Number: 5,943,639
[45] Date of Patent: *Aug. 24, 1999

[54] DISPLACEMENT DETECTION APPARATUS INCLUDING AN ERROR CORRECTION SYSTEM

[75] Inventors: Takashi Tanaka; Masaaki Kusumi, both of Tokyo, Japan

[73] Assignee: Sony Magnescale Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/545,504

[22] Filed: Oct. 19, 1995

[30] Foreign Application Priority Data

Oct. 20, 1994 [JP] Japan .................................. 6-255496

[51] Int. Cl.$^6$ ...................................................... G01B 7/02
[52] U.S. Cl. ......................... 702/163; 702/158; 702/97; 324/207.12; 324/207.23; 324/207.25
[58] Field of Search ..................................... 364/487, 481, 364/483, 486, 474.31, 167.01, 474.287, 474.35, 550, 551.01, 559–566, 571.01, 571.05, 577, 582, 516, 715.07; 327/50, 56, 63, 77, 78, 35, 37, 64, 238, 244, 307, 233, 62, 82, 331, 332, 362; 324/76.52, 76.77, 76.78, 76.82, 207.11–207.13, 207.16, 207.21, 207.23–207.25, 233, 650, 607; 340/870.04, 870.05, 870.16, 870.21, 870.25; 250/231.13–231.18; 318/602, 605, 652, 653; 360/30, 32, 46, 58; 341/110, 112, 113, 115, 118, 143, 155, 156, 5, 15, 94; 73/1.79, 1.81; 356/373–375; 702/33, 36, 44, 57, 64–75, 79, 85–88, 94, 95, 97, 104–107, 124, 126, 149–151, 155, 158, 161–166, 189, 191, 194, 195

[56] References Cited

U.S. PATENT DOCUMENTS

| | | | |
|---|---|---|---|
| 4,221,056 | 9/1980 | Koenuma | 702/161 |
| 4,462,083 | 7/1984 | Schwefel | 364/577 |
| 4,481,464 | 11/1984 | Noguchi et al. | 324/607 |
| 4,987,414 | 1/1991 | Iijima et al. | 341/15 |
| 5,184,062 | 2/1993 | Ladwig | 702/87 |
| 5,192,917 | 3/1993 | Schweigert et al. | 327/50 |
| 5,353,019 | 10/1994 | Rupp | 340/870.05 |
| 5,414,516 | 5/1995 | Morishita et al. | 356/374 |
| 5,432,443 | 7/1995 | Maejima et al. | 324/207.24 |
| 5,453,684 | 9/1995 | Nahayama | 318/653 |
| 5,485,407 | 1/1996 | Ishimoto et al. | 364/577 |
| 5,535,142 | 7/1996 | Mehnert et al. | 702/189 |
| 5,625,310 | 4/1997 | Takeishi | 327/233 |

FOREIGN PATENT DOCUMENTS

| | | |
|---|---|---|
| 0 489 936 A1 | 6/1992 | European Pat. Off. . |
| 0 496 095 A1 | 7/1992 | European Pat. Off. . |
| 0 599 175 A1 | 6/1994 | European Pat. Off. . |
| 2-251720 | 10/1990 | Japan . |

OTHER PUBLICATIONS

Patent Abstracts of Japan, vol. 17, No. 487 (E–1427), Sep. 3, 1993.

*Primary Examiner*—Hal Dodge Wachsman
*Attorney, Agent, or Firm*—Foley & Lardner

[57] ABSTRACT

A displacement detecting apparatus includes an error correcting circuit through which a pair of sine wave signals detected by a detecting head unit are corrected. A signal detecting circuit receives the pair of sine wave signals whose phases are shifted by about 90°, and detects a magnitude of one of the two sine wave signal when the other one of the two sine wave signals crosses with a reference voltage level. The error correcting circuit calculates an error correction amount of each sine wave signal according to the detected magnitude of the signal and eliminates the calculated error correction amount from the signals. Therefore, the sine wave signals of position information are accurately corrected in direct-current component, voltage ratio and phase difference.

27 Claims, 18 Drawing Sheets

FIG.8
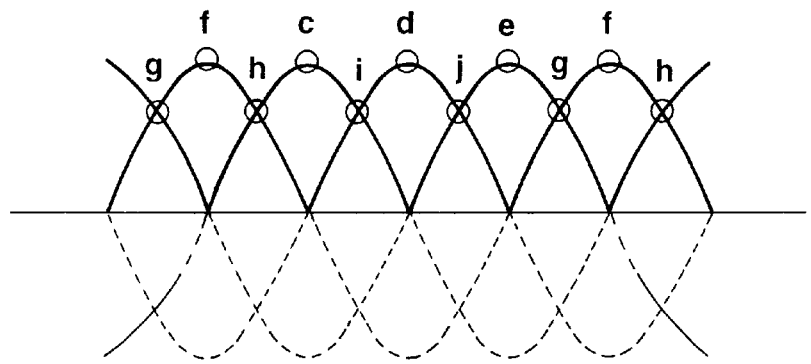
FIG.9
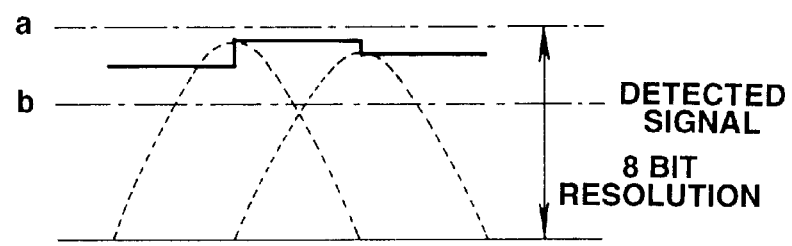
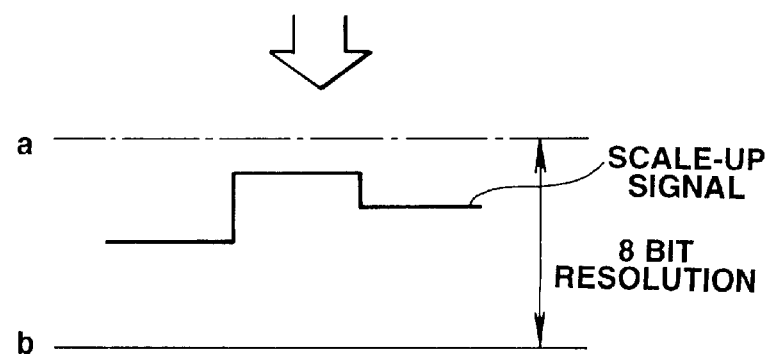

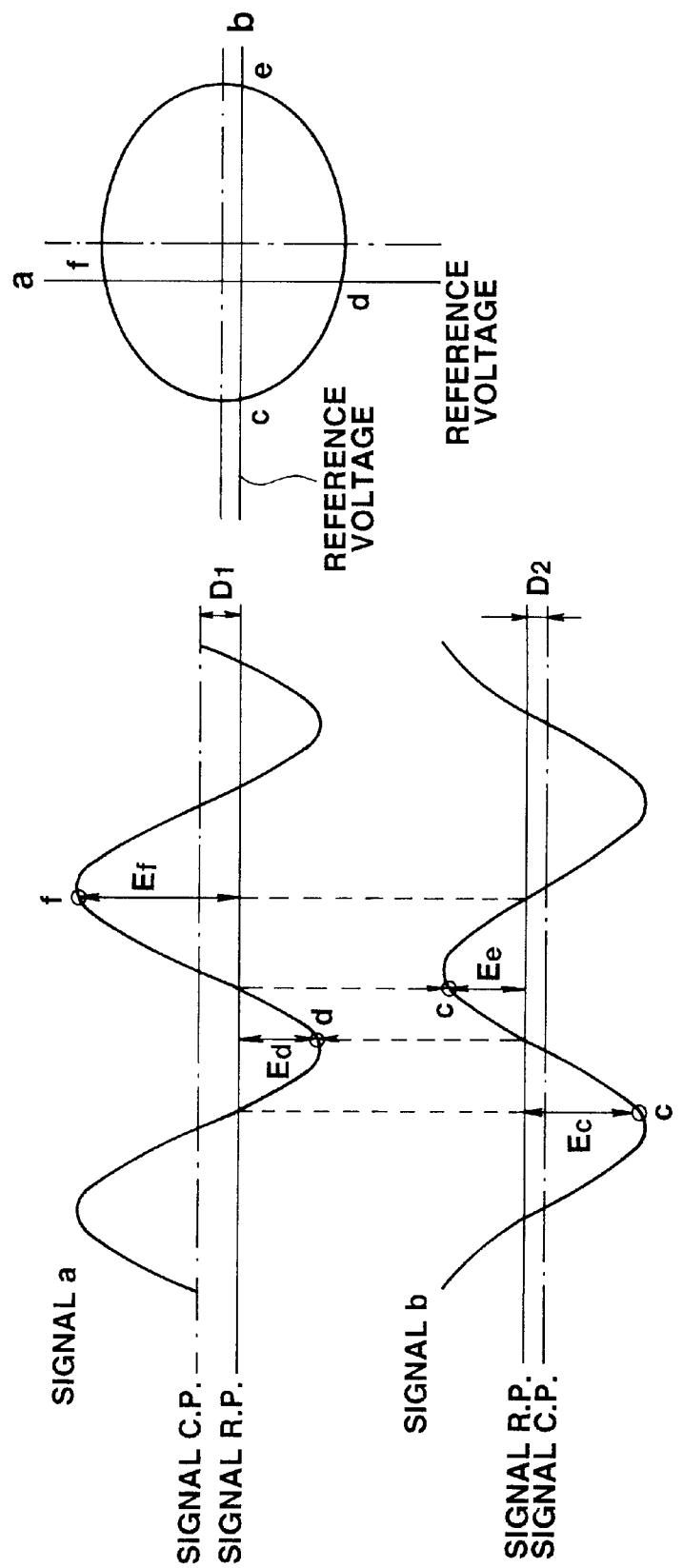

$$E_A = A \sin\left(\frac{2\pi}{\lambda} X\right)$$

$$E_B = B \cos\left(\frac{2\pi}{\lambda} X\right)$$

$E_A = A \sin\left(\frac{2\pi}{\lambda} X\right) + D_1$ $E_B = B \cos\left(\frac{2\pi}{\lambda} X + \delta\right) + D_2$

SAMPLING INTERVAL

DISPLACEMENT DETECTION APPARATUS INCLUDING AN ERROR CORRECTION SYSTEM

BACKGROUND OF THE INVENTION

The present invention relates to improvements in a displacement detecting apparatus which includes an error correcting subsystem.

Generally, a displacement detecting apparatus (scale apparatus) utilizes an interpolation method for dividing a regenerated wave length $\lambda$ of an incremental signal, in order to have a high-resolution that can distinguish the regenerated wave length $\lambda$ of an incremental signal. As shown in FIGS. 16A to 16D, when an electromagnetic division (scale) are formed on a scale 1001, signals detected by detection heads 1002 and 1003 are represented as follows:

$$E_A = A \sin(2\pi X/\lambda), E_B = B \cos(2\pi X/\lambda)$$

where A and B are amplitudes of detected signals $E_A$ and $E_B$, and X is a postion of a detection head.

Assuming that B=A, the equation $E_A/E_B = A \sin(2\pi X/\lambda)/A \cos(2\pi X/\lambda) = \tan(2\pi X/\lambda)$ is derived. Accordingly, the equation $X = (\lambda/2\pi) \arctan(E_A/E_B)$ is obtained. This relationship by this equation forms a Lissajous figure of FIG. 16D. As shown in FIG. 16D, since A=B, the Lissajous figure becomes a circle. Assuming that the position X of the head is $(\lambda/2\pi)\theta(X=(\lambda/2\pi)\theta)$, the phase $\theta$ thereof is represented by $(E_A/E_B)$, that is, $\theta = \arctan(E_A/E_B)$. At this time, the errors of the signals are generated if one of the following conditions is satisfied: a first condition that a direct current component is superposed on the incremental signal as shown in FIGS. 17A to 17C; a second condition that the amplitude of the signal a becomes different from that of the signal b, and a third condition that the phase 30 shift between the signals a and b is not accurately controlled at 90°. Signal values Ea and Eb of such signals a and b can be represented as follows:

$$E_a = A \sin(2\pi X/\lambda) + D_1, E_b = B \sin\{(2\pi X/\lambda) + \delta\} + D_2$$

The head position X within one wave length $\lambda$ is represented as follows:

$$X = (\lambda/2\pi) \arctan(E_a/E_b)$$

In this case, the Lissajous figure forms an ellipse as shown in FIG. 17C.

In order to eleminate such direct-current components $D_1$ and $D_2$, Japanese Patent Provisional Publication No. 2-251720 discloses a correction system as shown in FIG. 18. In this conventional system, signals a and b indicative of a scale detected from a scale 1 are sent to an A/D converter (analog-to-digital converter) wherein the signals a and b are converted into digital signals. The digital signals are sent to a digital signal processing circuit 8 of a CPU (Central Processing Unit) wherein the calculation for a correction is executed. As shown in FIG. 18, the detected signals a and b from detectors 2 and 3 on the scale 1 are supplied to a digital signal processing circuit 8 through amplifiers 4 and 5 and A/D converters 6 and 7. The digital signal processing circuit 8 samples the signals a and b as shown in FIG. 19 and stores them in a RAM 10. The digital signal processing circuit 8 obtains a maximum value and a minimum value of each signal data by comparing the newest data of the signals a and b with the previously stored data. Further, direct-current component (deviations) $D_1$ and $D_2$ are obtained by calculating a mid point between the maximum and minimum values of each signal. By subtracting the obtained direct-current components (deviations) $D_1$ and $D_2$ from the signals a and b, the digital signal processing circuit 8 generates corrected signals and supplies them to a data conversion circuit 11 wherein A/B phase signal is generated.

The overlapped errors on the detection sensors 2 and 3 are controlled by the above-mentioned circuit. In addition to this error correction, the scale apparatus further required to eliminate various error factors such as a deviation of the direct-current error component due to the external magnetic field as shown in FIG. 20A, an output deviation due to a clearance deviation between a storage medium and the detection head as shown in FIG. 20B and a deviation due to phase deviation caused by the waviness of a head-running standard surface as shown in FIG. 20C. In order to eliminate such errors, the scale apparatus of Japanese Patent Provisional Publication No. 2-251720 is provided with a direct-current component detecting circuit, an output amplitude detecting circuit and a phase detecting circuit for obtaining respective correction values. The scale apparatus including a correction circuit calculates the amount of error from the correction values. The digital signal processing circuit 8 executes a correction of errors according to the direct-current component, an output amplitude difference and a phase shift of the signals a and b. More particularly, the scale apparatus obtains a maximum value and a minimum value of each signal a, b and executes a correction of the signals a and b by calculations. The corrected signals are supplied to an interpolation circuit wherein arc-tangent of the corrected signals are obtained as an interpolation.

However, with this conventional correcting method of the scale apparatus, it is necessary to execute a high-speed sampling for detecting peak values of the signals a and b as shown in FIG. 19 and to frequently execute calculations of a complicated trigonometric function. Therefore, such a displacement detecting apparatus has to provide two high-speed A/D converters and a high-speed performing CPU or digital signal processor. Further, since the signals a and b from the scale is deviated due to the temperature deviation, it is necessary to provide a high-bit and high-accuracy A/D converter. These installations largely increase the cost of the correction circuit and therefore the displacement detecting apparatus including this correction circuit is largely increased in cost.

SUMMARY OF THE INVENTION

It is an object of the present invention to provide an improved displacement detecting apparatus which is free from the above-mentioned drawbacks.

A displacement detecting apparatus according to the present invention comprises a detection head unit which detects two sine wave signals whose phases are shifted by about 90°. A signal detecting circuit detects a magnitude of one of the two sine wave signal when the other one of the two sine wave signals crosses with a reference voltage level. A correcting circuit calculates an error correction amount of each sine wave signal according to the detected magnitude of the signal and eliminates the calculated error correction amount from the signals.

BRIEF DESCRIPTION OF THE DRAWINGS

FIG. 8 is a wave-form chart for explaining a reading point of an inversion signal;

FIG. 9 is a wave-form chart which shows a change between a signal and a scale-up signal;

FIGS. 13A and 13B are wave-form charts for explaining an improved error-component detecting manner;

DETAILED DESCRIPTION OF THE INVENTION

Figure 1:
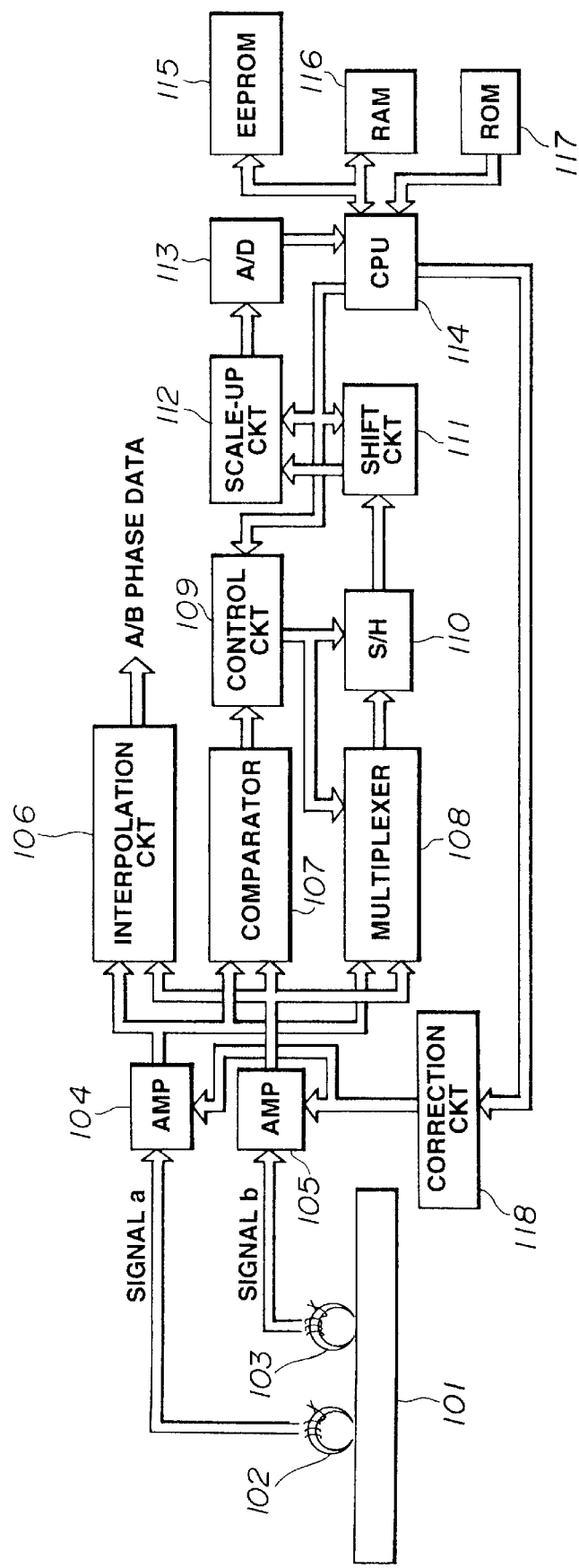
FIG. 1 is a block diagram showing an example of a correction circuit of a displacement detecting apparatus according to the present invention.

Referring to drawings, preferred embodiments of a displacement detecting apparatus according to the present invention will be discussed.

First, as to a case that a deviation of a phase difference between signals a and b is smaller than a predetermined value and that a direct-current component and an amplitude ratio of the signals are corrected, the manner of correcting operation will be discussed hereinafter with reference to FIGS. 13A, 13B, 14A and 14B.

When the output voltages of the signals a and b are Ea and Eb and when $\theta=2\pi X/\lambda$, the following equations (1) and (2) are obtained.

$$Ea = A \sin\theta + D_1 \quad (1)$$

$$Eb = B \cos\theta + D_2 \quad (2)$$

From the equations (1) and (2), values Ec, Ed, Ee and Ef at detection points c, d, e and f are obtained. If each phase at each of the detection points c, d, e and f is $\theta c$, $\theta d$, $\theta e$, $\theta f$ as shown in FIG. 13A, four sets of the simultaneous equations are given. As to the detection point c, the following simultaneous equations are given:

$$Eac = A \sin\theta c + D_1 = 0 \quad (3)$$

$$Ebc = B \cos\theta c + D_2 = Ec \quad (4)$$

wherein Eac is a value of signal a at the detection point c, and Ebc is a value of signal b at the detection point c.

From the equation (3), the following equation is obtained:

$$\sin\theta c = -D_1/A \quad (5)$$

The equation (5) can be deformed by the relationship in the trigonometric function as follows:

$$\cos\theta c = -\sqrt{1 - (-D_1/A)^2} \quad (6)$$

By substituting this equation (6) into the equation (4), the following equation is obtained:

$$D_2 = B\sqrt{1 - (-D_1/A)^2} + E_c \quad (7)$$

Similarly, as to the detection point e, the following simultaneous equations are obtained.

$$Eae = A \sin\theta e + D_1 = 0 \quad (8)$$

$$Ebe = B \cos\theta e + D2 = Ee \quad (9)$$

wherein Eae is a value of signal a at the detection point e, and Ebe is a value of signal b at the detection point e.

Accordingly, the following equation is obtained;

$$D_2 = -B\sqrt{1 - (-D_1/A)^2} + E_e \quad (10)$$

Finally, from the equations (7) and (10), the following equation is obtained.

$$D_2 = (E_c + Ee)/2 \quad (11)$$

As to the detection point d, the following simultaneous equations are obtained:

$$Ead = A \sin\theta d + D_1 = Ed \quad (12)$$

$$Ebd = B \cos\theta d + D_2 = 0 \quad (13)$$

wherein Ead is a value of signal a at the detection point d, and Ebd is a value of signal b at the detection point d.

As to the detection point f, the following simultaneous equations are given:

$$Eaf = A \sin\theta f + D_1 = Ef \quad (14)$$

$$Ebf = B \cos\theta f + D_2 = 0 \quad (15)$$

wherein Eaf is a value of signal a at the detection point f, and Ebf is a value of signal b at the detection point f.

As is the same as that in the detection points c and e, from the two sets of the simultaneous equations (12) and (13), (14) and (15), the following equation indicative of the direct-current component is obtained.

$$D_1 = (Ed + Ef)/2 \quad (16)$$

Next, as to the output amplitudes A and B, the following equations are obtained.

$$A = Ed \Big/ \sqrt{1 - (D_2/B)^2} \qquad (17)$$

$$B = Ec \Big/ \sqrt{1 - (D_2/A)^2} \qquad (18)$$

Figure 14B:
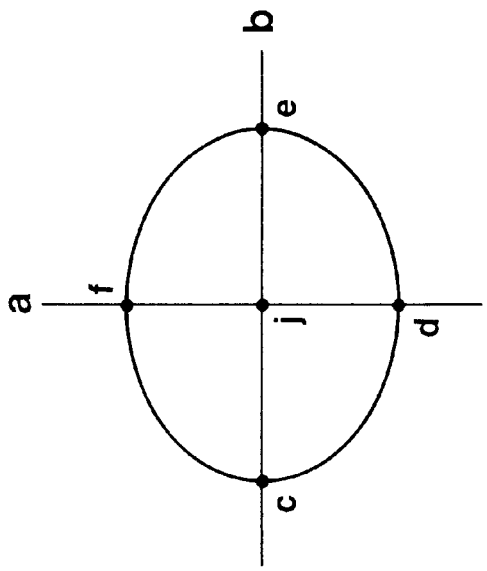
FIGS. 14A and 14B are wave-form charts for explaining an improved error-component detecting manner.
Figure 14A:
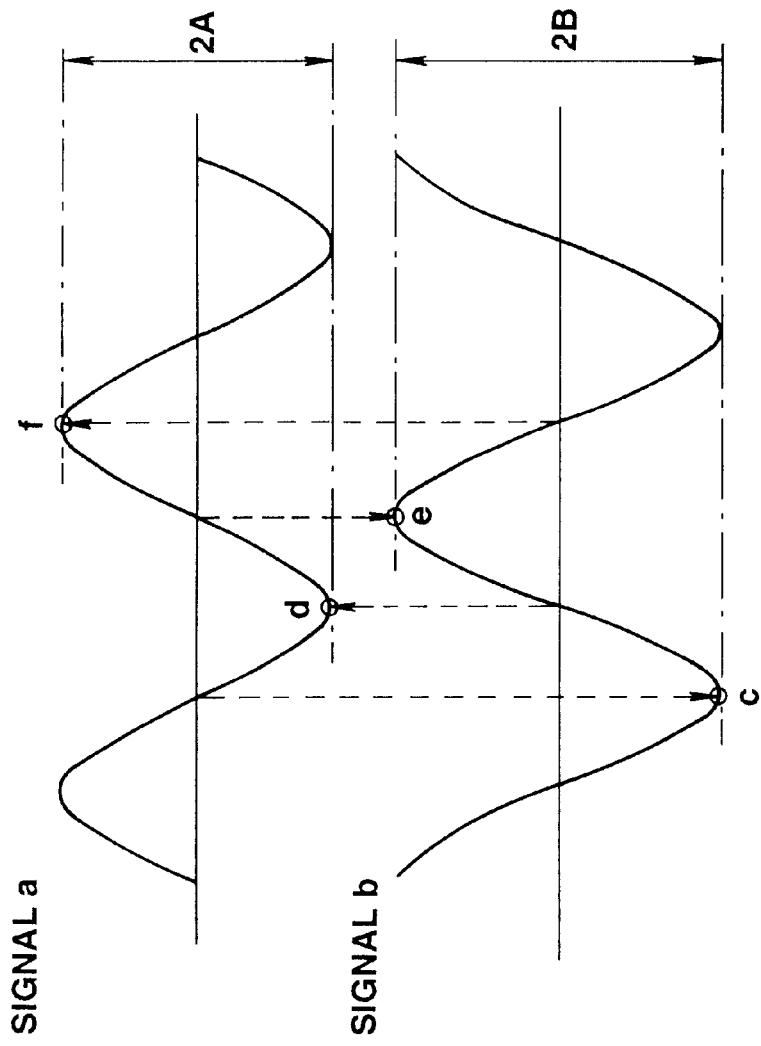

Although the output amplitudes A and B are obtained by the above equations (17) and (18), this solving calculation takes a long time. Therefore, only the correction as to the direct current component is carried out, and the correction as to the amplitude ratio of the signals a and b is not carried out. By the correction of the direction-current component, the signals a and b have a generally zero direct-current component. That is, $D_1 = D_2 = 0$. Accordingly, as shown in FIGS. 14A and 14B, the read-in voltage values indicate output amplitudes of the respective signals a and b as follows:

$$A = Ed = Ef \qquad (19)$$

$$B = Ec = Ee \qquad (20)$$

Next, as to a case that the corrections of all components including the phase correction are executed, the manner of adjusting operation will be discussed hereinafter.

When Ea and Eb are output voltage values of the signals a and b, and $\theta = 2\pi X/\lambda$, the following equations are obtained.

$$Ea = A \sin \theta + D_1 \qquad (21)$$

$$Eb = B \cos (\theta + \delta) + D_2 \qquad (22)$$

As shown in FIGS. 13A and 13B, values Ec, Ed, Ee and Ef at detection points c, d, e and f are obtained. If each phase at each of the detection points c, d, e and f is $\theta c$, $\theta d$, $\theta e$, $\theta f$, four sets of the simultaneous equations are established. As to the detection point c, the following simultaneous equations are obtained:

$$Eac = A \sin \theta c + D_1 = 0 \qquad (23)$$

$$Ebc = B \cos (\theta c + \delta) + D_2 = Ec \qquad (24)$$

wherein Eac is a value of signal a at the detection point c, and Ebc is a value of signal b at the detection point c.

From the equation (23), the following equation (25) is derived.

$$\sin \theta c = -D_1/A \qquad (25)$$

From the equation (25), the following equations (26) and (27) are derived.

$$\cos \theta c = -\sqrt{1 - (-D_1/A)^2} \qquad (26)$$

$$\cos(\theta c + \delta) = \qquad (27)$$
$$\cos\theta_c \cos\delta - \sin\theta_c \sin\delta = -\sqrt{1 - (-D_1/A)^2} \cos\delta + (D_1/A)\sin\delta$$

By substituting the equation (27) into the equation (24), the following equation is obtained.

$$D_2 = B\left\{\sqrt{1 - (D_1/A)^2} \cos\delta - (D_1/A)\sin\delta\right\} + Ec \qquad (28)$$

As to the detection point e, the following simultaneous equations are established.

$$Eae = A \sin \theta e + D_1 = 0 \qquad (29)$$

$$Ebe = B \cos (\theta e + \delta) + D_2 = Ee \qquad (30)$$

wherein Eae is a value of the signal a at the detection point e, and Ebe is a value of signal b at the detection point e.

By the equation modulation similar to that as to the detection point c, the following equation is obtained.

$$D_2 = B\left\{-\sqrt{1 - (D_1/A)^2} \cos\delta - (D_1/A)\sin\delta\right\} + Ee \qquad (31)$$

From the equations (28) and (31), the direct current component $D_2$ of the signal b is obtained as follows:

$$D_2 = (Ec + Ee)/2 - (D_1/A)\sin \delta \qquad (32)$$

As to the detection point d, the following simultaneous equations are established.

$$Ead = A \sin \theta d + D_1 = Ed \qquad (33)$$

$$Ebd = B \cos (\theta d + \delta) + D_2 = 0 \qquad (34)$$

wherein Ead is a value of signal a at the detection point d, and Ebd is a value of signal b at the detection point d.

From the equation (34), the following equations are derived.

$$\cos(\theta d + \delta) = -D_2/B \qquad (35)$$

$$\sin(\theta d + \delta) = -\sqrt{1 - (-D_2/B)^2} \qquad (36)$$

$$\sin\theta d = \sin(\theta d + \delta - \delta) = \sin(\theta d + \delta)\cos\delta - \cos(\theta d + \delta)\sin\delta = \qquad (37)$$
$$-\sqrt{1 - (-D_2/B)^2} \cos\delta + (D_2/B)\sin\delta$$

Accordingly, the direct-current component $D_1$ of the signal a is derived as follows:

$$D_1 = A\left\{\sqrt{1 - (D_2/B)^2} \cos\delta - (D_2/B)\sin\delta\right\} + Ed \qquad (38)$$

As to the detection point f, the following simultaneous equations are established.

$$Eaf = A \sin \theta f + D_1 = Ef \qquad (39)$$

$$Ebf = B \cos (\theta f + \delta) + D_2 = 0 \qquad (40)$$

wherein Eaf is a value of signal a at the detection point f, and Ebf is a value of signal b at the detection point f.

$$D_1 = A\left\{-\sqrt{1 - (D_2/B)^2} \cos\delta - (D_2/B)\sin\delta\right\} + Ef \qquad (41)$$

From the equations (38) and (41), the following equation is obtained.

$$D_1 = \{(Ed + Ef)/2\} - (D_2/B) \sin \delta \qquad (42)$$

Since $(D_1/A) \sin \delta$ of the equation (32) and $(D_2/B) \sin \delta$ of the equation (42) are considerably smaller than $D_1$ and $D_2$, the direct-current component is deceased by executing the correction. Accordingly, by repeatedly executing this correction within a predetermined interval (such as twice or three times), the direct-current components of the signals are corrected. By the correction of the direct-current components of the signals a and b, the values $D_1$ and $D_2$ are converged into zero. Therefore, the correction of the amplitude ratio of the signals a and b is executed thereafter.

From the equations (31) and (41), the amplitudes A and B are expressed as follows:

$$A = Ef/\cos\delta \qquad (43)$$

$$B = Ee/\cos\delta \qquad (44)$$

Although the output ratio is decreased according the shift amount δ of the phase, the output of the signals is also decreased with the same ratio as that of the output ratio. Therefore, the ratio between the amplitudes A and B is equally corrected.

Figure 15B:
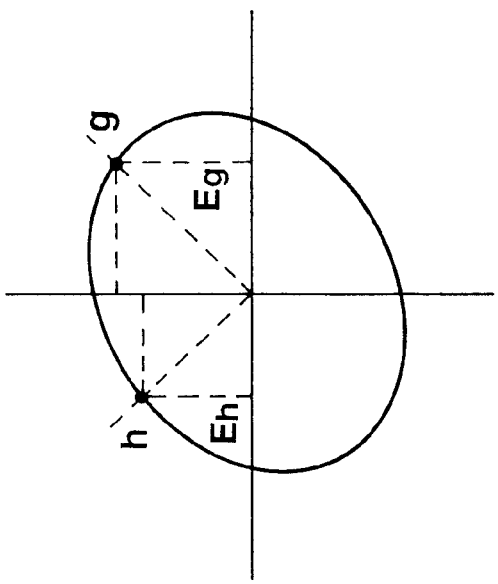
FIGS. 15A and 15B are wave form charts for explaining an improved error-component detecting manner.
Figure 15A:
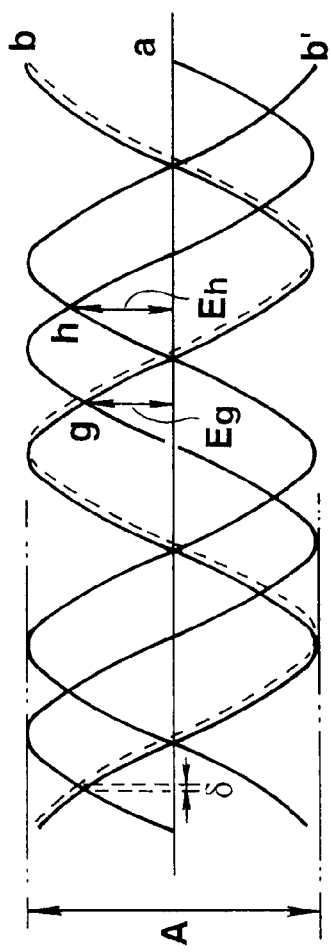
Figure 16A:
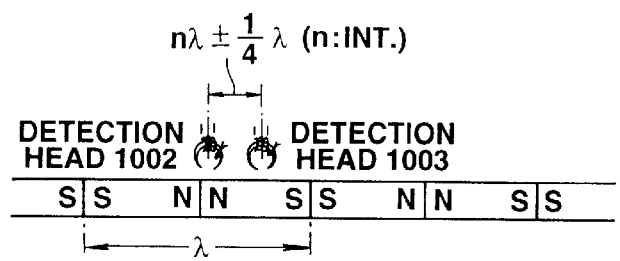
FIG. 16A is a schematic view which shows a scale and a pair of detection heads of a conventional displacement detection apparatus.
Figure 16B:
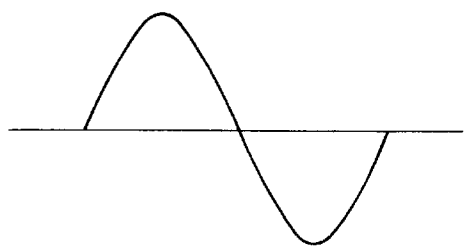
FIGS. 16B, 16C and 16D are wave form charts showing a relationship between the detection heads of FIG. 16A.
Figure 16C:
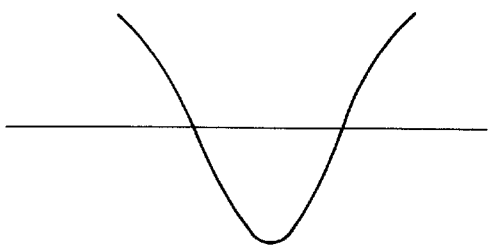
Figure 16D:
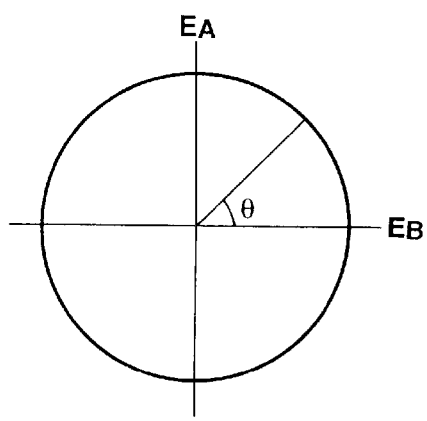
Figure 17A:
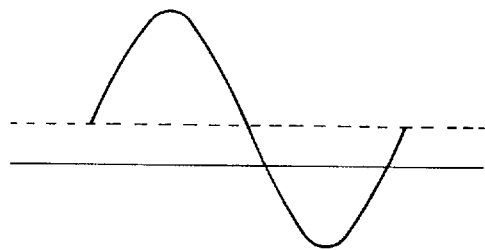
FIGS. 17A, 17B and 17C are wave form charts showing a relationship between the detection heads.
Figure 17B:
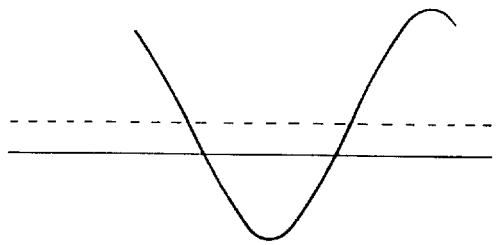
Figure 17C:
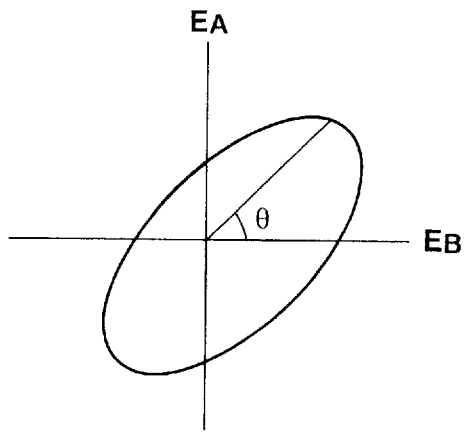
Figure 18:
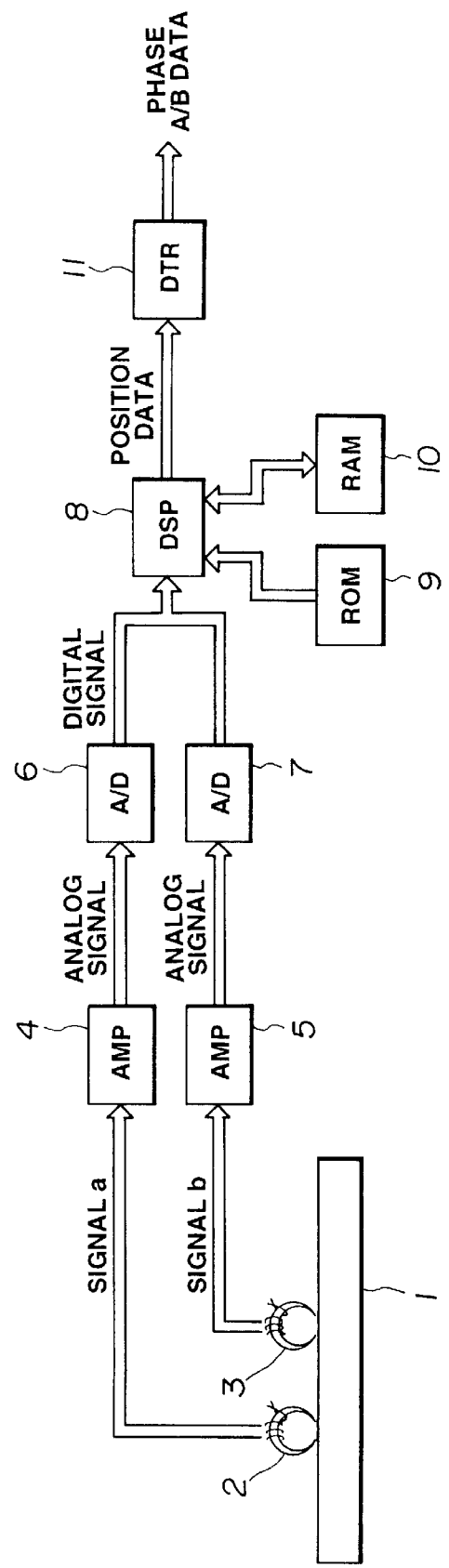
FIG. 18 is a block diagram showing a conventional correction circuit for a displacement detecting apparatus.
Figure 19:
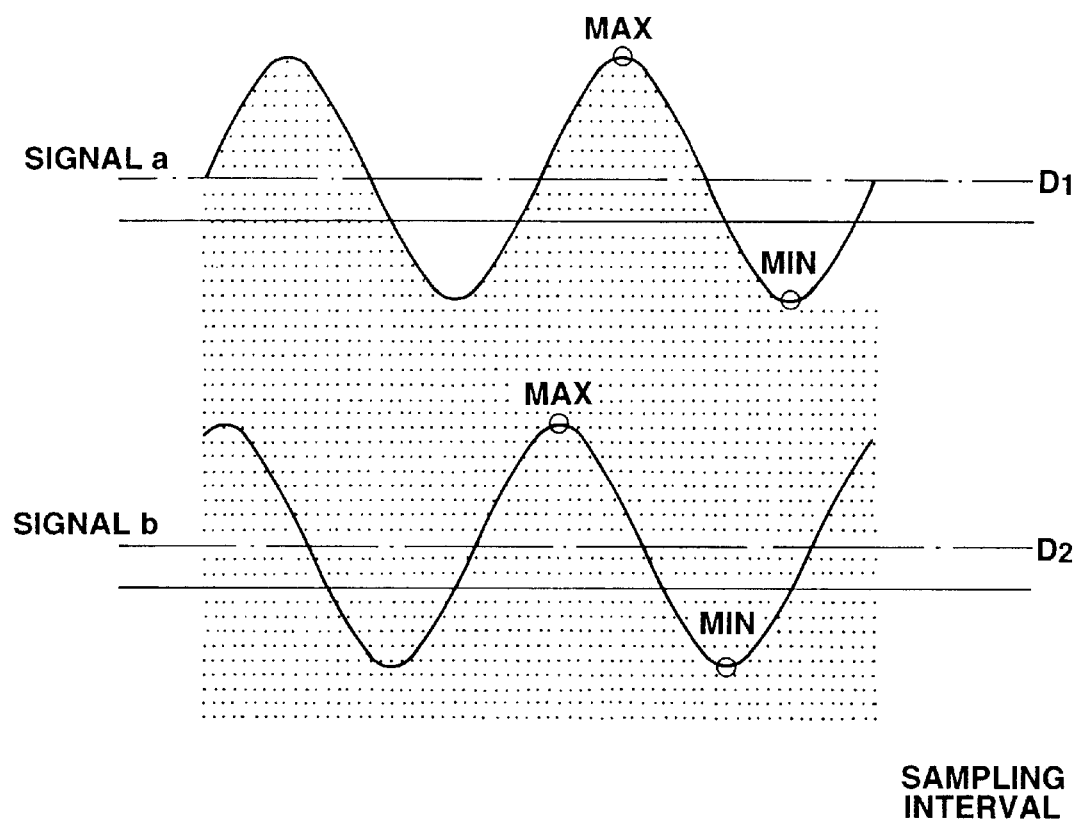
FIG. 19 is a wave form chart for explaining a signal sampling of a conventional displacement detecting apparatus.
Figure 20A:
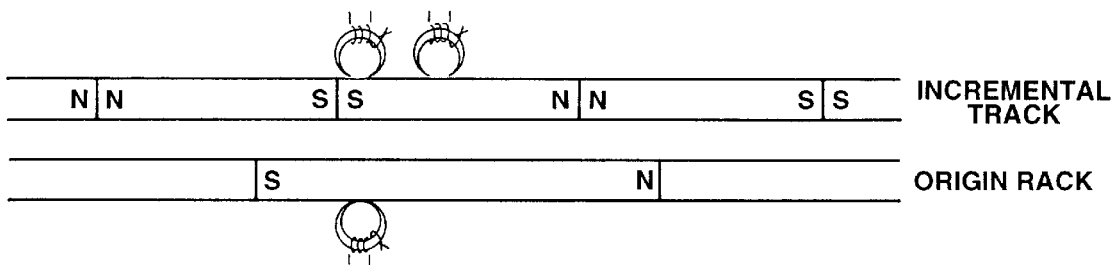
FIGS. 20A, 20B and 20C are views for explaining error deviation factors of a displacement detecting apparatus.
Figure 20B:
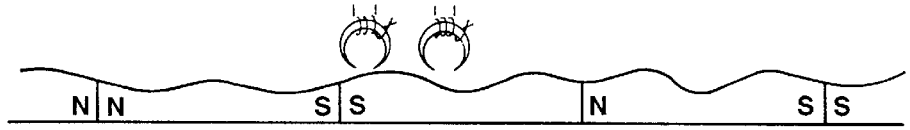
Figure 20C:
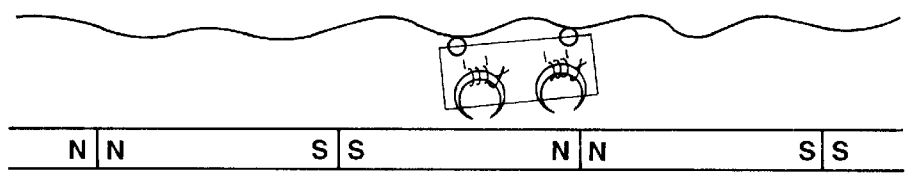

The detection of the phase is executed as shown in FIGS. 15A and 15B after the corrections of the direct-current component and the amplitude. That is, the values Eg and Eh of the voltages at the detection point g and h are read. The voltage values Eg and Eh are expressed as follows:

$$Eg = A\sin\{(\pi/4)-\delta\} = A\cos\{(\pi/4)+\delta\} \qquad (45)$$

$$Eh = A\sin\{(\pi/4)+\delta\} \qquad (46)$$

Therefore, the following equations are derived.

$$Eh/Eg = \tan\{(\pi/4)+\delta\} \qquad (47)$$

$$\delta = \arctan(Eh/Eg) - \pi/4 \qquad (48)$$

The correction of the phase of the signal a, b is executed by using the phase shift amount of the equation (48).

Referring to FIG. 1, a first embodiment of a displacement detecting apparatus according to the present invention will be discussed hereinafter. The displacement detecting apparatus comprises a measuring scale 101 on which a pair of sensors 102 and 103 are slidably disposed. The sensor 102 outputs a detected signal a to an amplifier 104. The amplified signal a in the amplifier 104 is sent to an interpolation circuit 106, a comparator 107 and a multiplexer 108. Also, the sensor 103 outputs a detected signal b to an amplifier 105. The amplified signal b is sent to the interpolation circuit 106, the comparator 107 and the multiplexer 108. The amplifiers 104 and 105 are connected through a correction circuit 118 with a CPU (central processing unit) 114 which is connected with an EEPROM (electrically erasable and programmable ROM) 115, a RAM (random access memory) 116 and a ROM (read-only memory) 117. The amplifiers 104 and 105 amplify the detected signals a and b into a required level while controlling a direct-current component, a voltage ratio and a phase of each signal a, b according to preset values in the EEPROM 115. The interpolation circuit 106 interpolates the received signals a and b and outputs an A/B phase signal. The comparator 107 compares the signals a and b with a reference voltage to detect a zero-crossing point of the signals a and b.

Figure 3A:
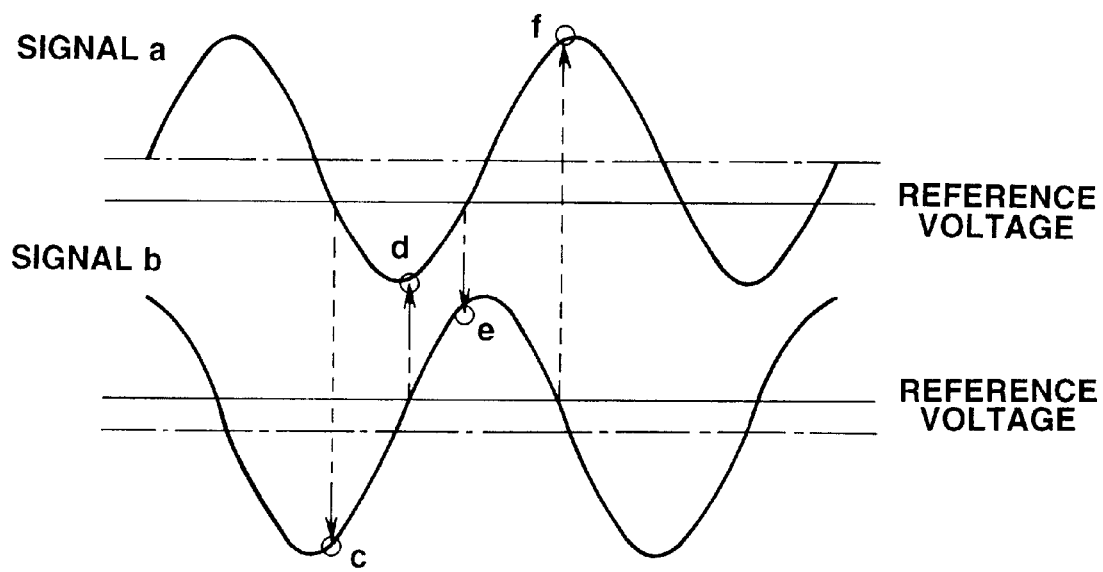
FIGS. 3A and 3B are wave form charts for explaining a detection of zero-crossing of signals in the displacement detecting apparatus.
Figure 3B:
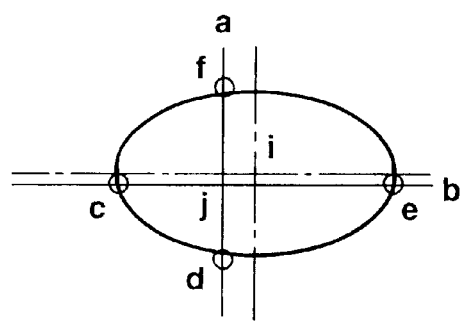
Figure 4A:
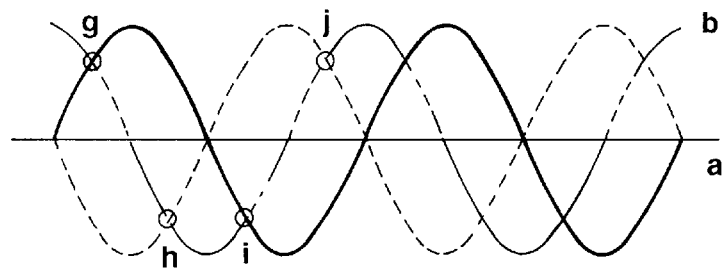
FIGS. 4A and 4B are wave form charts for explaining a detection of an absolute value correspondence between the signals.
Figure 4B:
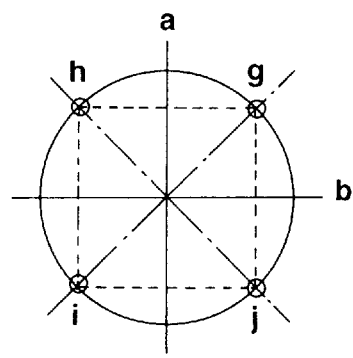

FIG. 3A shows zero-crossing points of the signals a and b. That is, at a point c where the signal a first crosses with the reference voltage, a voltage value Ebc of the signal b is detected. At a point e where the signal a next crosses with the reference voltage, a voltage value Ebe of the signal b is detected. Similarly, at a point d where the signal b first crosses with the reference voltage, a voltage value Ead of the signal a is detected. At a point f where the signal b next crosses with the reference voltage, a voltage value Eaf of the signal a is detected. By plotting the voltage values Ebc, Ebe, Ead and Eaf on a-axis and b-axis which are perpendicularly crossed with each other, a Lissajous figure as shown in FIG. 3B is obtained.

Figure 6:
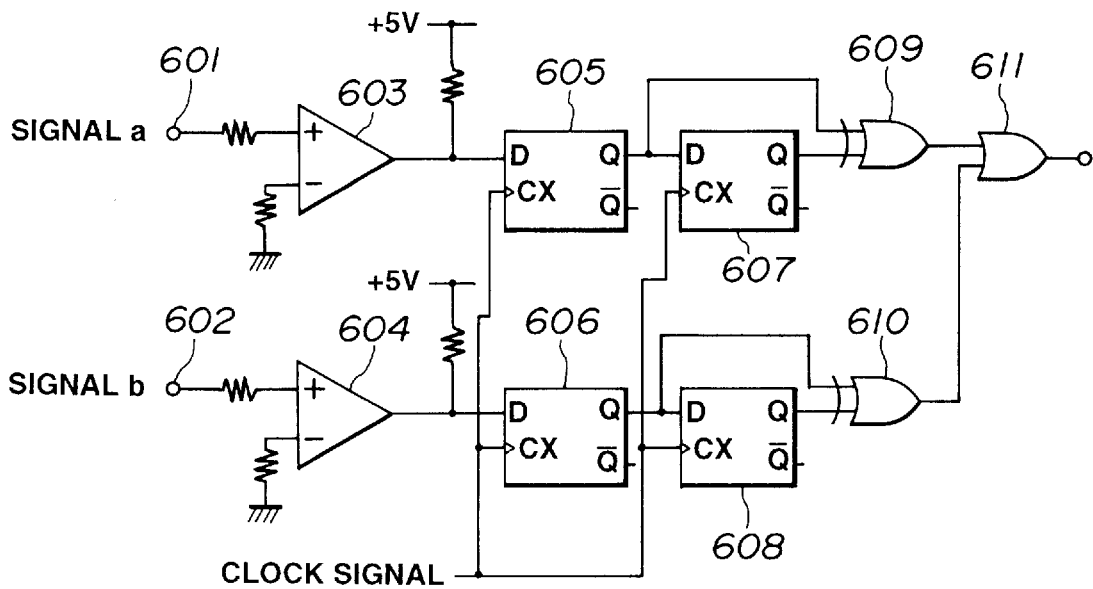
FIG. 6 is a circuit diagram of a zero-crossing point detection circuit.

FIG. 6 shows a detection circuit for detecting a zero-crossing point. The structure of the detection circuit for the signal a is the same as that for the signal b. The signal a inputted to an input terminal 601 is compared with a reference voltage in a comparator 603 as to whether the signal a is crossing with the reference voltage. When the signal a crosses with the reference voltage, the comparator 603 outputs a pulse signal indicative that the signal a is crossing with the reference voltage. The outputted signal is inputted to a first flip-flop circuit 605 according to a clock signal. The output of the first flip-flop circuit 605 is inputted to a second flip-flop circuit 607 according to a next clock signal. The outputs of the first and second flop-flip circuits 605 and 607 are supplied to an exclusive-OR circuit 609. The output of the exclusive-OR circuit 609 is supplied to an OR circuit 611. Similarly, the signal b inputted to an input terminal 602 is compared with a reference voltage in a comparator 604 as to whether the signal b is crossing with the reference voltage. When the signal b crosses with the reference voltage, the comparator 604 outputs a pulse signal indicative that the signal b is crossing with the reference voltage. The outputted signal is inputted to a first flip-flop circuit 606 according to a clock signal. The output of the first flip-flop circuit 606 is inputted to a second flip-flop circuit 608 according to a next clock signal. The outputs of the first and second flop-flip circuits 606 and 608 are supplied to an exclusive-OR circuit 610. The output of the exclusive-OR circuit 610 is supplied to the OR circuit 611. With this circuit, when the signal a or b crosses with the reference voltage, a signal indicative of the crossing of the signal a, b with the reference voltage is outputted.

As shown in FIG. 1, the output of the comparator 107 is supplied to a control circuit 109 which controls a multiplexer 108 so as to input the signals a and b into a sample-and-hold circuit 110. The sample-and-hold circuit 110 executes a sampling of a momentum value of each signal a, b and stores it. The stored signal in the sample-and-hold circuit 110 is supplied to a shift circuit 111 where the signal is shifted according to a signal from the CPU 114 and a necessary part of the signal is outputted to a scale-up circuit 112 wherein the necessary part of the signal is scaled up and the scale-up signal is outputted to an A/D converter (analog-to-digital converter) 113. The A/D converter 113 converts the received signal into a digital signal and supplies it to the CPU 114. The CPU 114 calculates amplitudes of the signals a and b for the A/D converter 113 with reference to data in the EEPROM 115, the RAM 116 and the ROM 117. The calculated amplitudes are supplied to a correction circuit 118 as a correction signal. The correction circuit 118 executes a correction of the amplitudes of the signals a and b by applying the amplitude correcting signal to the amplifiers 104 and 105. The corrected signals, which are corrected as to the reference voltage and the amplitude, are supplied to the interpolation circuit 106 wherein a correct A/B phase signal is obtained.

Next, as to a case that three deviations of a direct-current component, an output voltage ratio and a phase shift of the signals a and b are corrected, the manner of the correcting operation will be discussed hereinafter.

Figure 7:
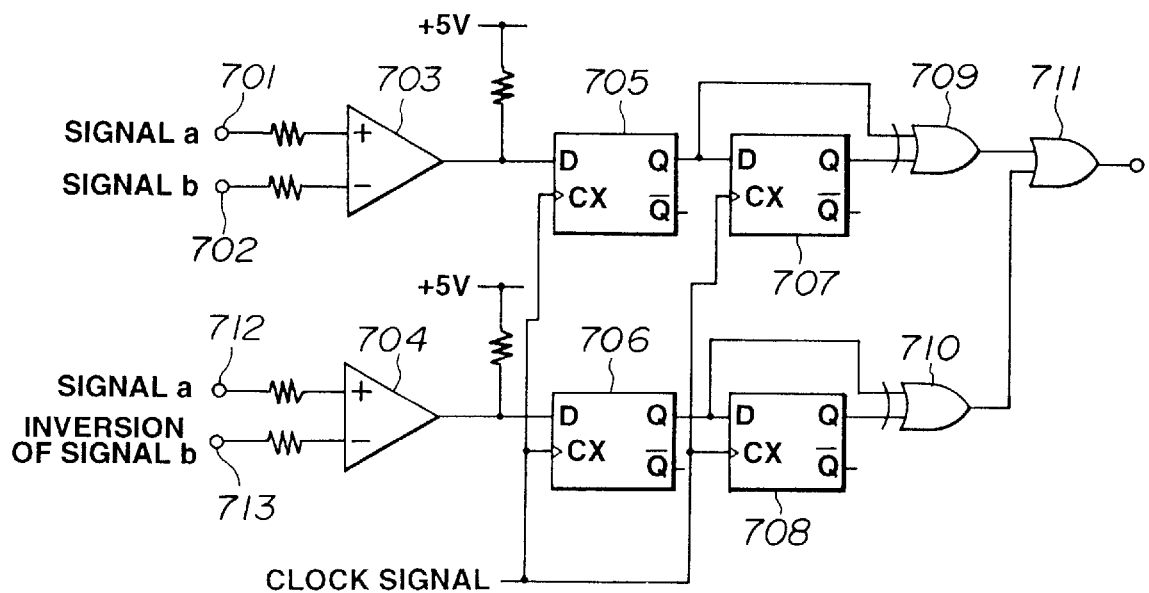
FIG. 7 is a circuit diagram of an absolute-value correspondence detection circuit.

Referring again to FIG. 1, the signals a and b detected by the sensors 102 and 103 are supplied to amplifiers 104 and 105 wherein the signals are amplified to a necessary level. The amplified signals in the amplifiers 104 and 105 are supplied to the interpolation circuit 106, the comparator 107 and the multiplexer 108. In the amplifiers 104 and 105, the direct-current component, the output voltage ratio and the phase of the signals a and b are controlled according to the preset values in the EEPROM 115. The interpolation circuit 106 interpolates the signals a and b and outputs an A/B phase signal. The comparator 107 compares the signals a and b with the reference voltage for detecting a zero-crossing point. The comparator 107 executes a detection of an absolute amount correspondence. FIGS. 6 and 7 show a circuit for detecting a zero-crossing point and a circuit for detecting a correspondence between absolute amounts of the signals a and b.

The circuit for detecting absolute amount correspondence will be discussed hereinafter with reference to a circuit diagram of FIG. 7. The signal a inputted to a terminal 701 and the signal b inputted to a terminal 702 are compared in a comparator 703 wherein a signal is ouputted when the signals a and b take the same value. The output from the comparator 703 is inputted to a first flip-flop circuit 705 according to a clock signal. The output of the first flip-flop circuit 705 is inputted to a second flip-flop circuit 707 according to a next clock signal. During this time, the output pulse is outputted through an exclusive-OR circuit 709. On the other hand, the signal a inputted to a terminal 712 and an inversion signal of the signal b inputted to a terminal 713 are supplied to a comparator 704 wherein a signal is outputted only when the signal a and the inversion signal of the signal b take the same value.

Figure 5:
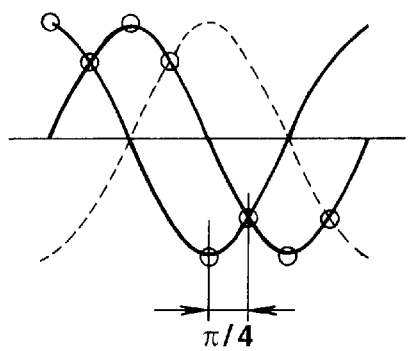
FIG. 5 is a wave form chart which shows an interval between read-in signals.

FIG. 8 shows the absolute values of the sine-wave and the cosine-wave. The points g, h, i and j, where the amplitude of the sine wave and the amplitude of the cosine wave are correspondent with each other, are marked. Further, the points f, c, d and e, where the absolute value of the sine-wave or cosine-wave takes maximum value, are marked. The signals are read-in at $\pi/4$ intervals as shown in FIG. 5.

When the zero-crossing point and the absolute amount correspondence point are detected, the signal is supplied through the multiplexer 108 to the sample-and-hold circuit 110 wherein the data is sampled and stored. The sampled signal is supplied to the shift circuit 111 wherein the data is shifted so that a part higher than the point where the absolute values of the sine-wave and cosine-wave correspond with each other is picked up. The data processed by the shift circuit 111 is supplied to a scale-up circuit 112. The scale-up circuit 112 scales up the signal in the vicinity of the corresponding point and supplies the signal scaled-up into a dynamic range to the A/D converter 113. The A/D converter 113 converts the signal indicative of a scaled-up portion of the initial signal. Therefore, the conversion by the A/D converter 113 is accurately executed. The digital signal converted in the A/D converter 113 is supplied to the CPU 114.

Figure 10:
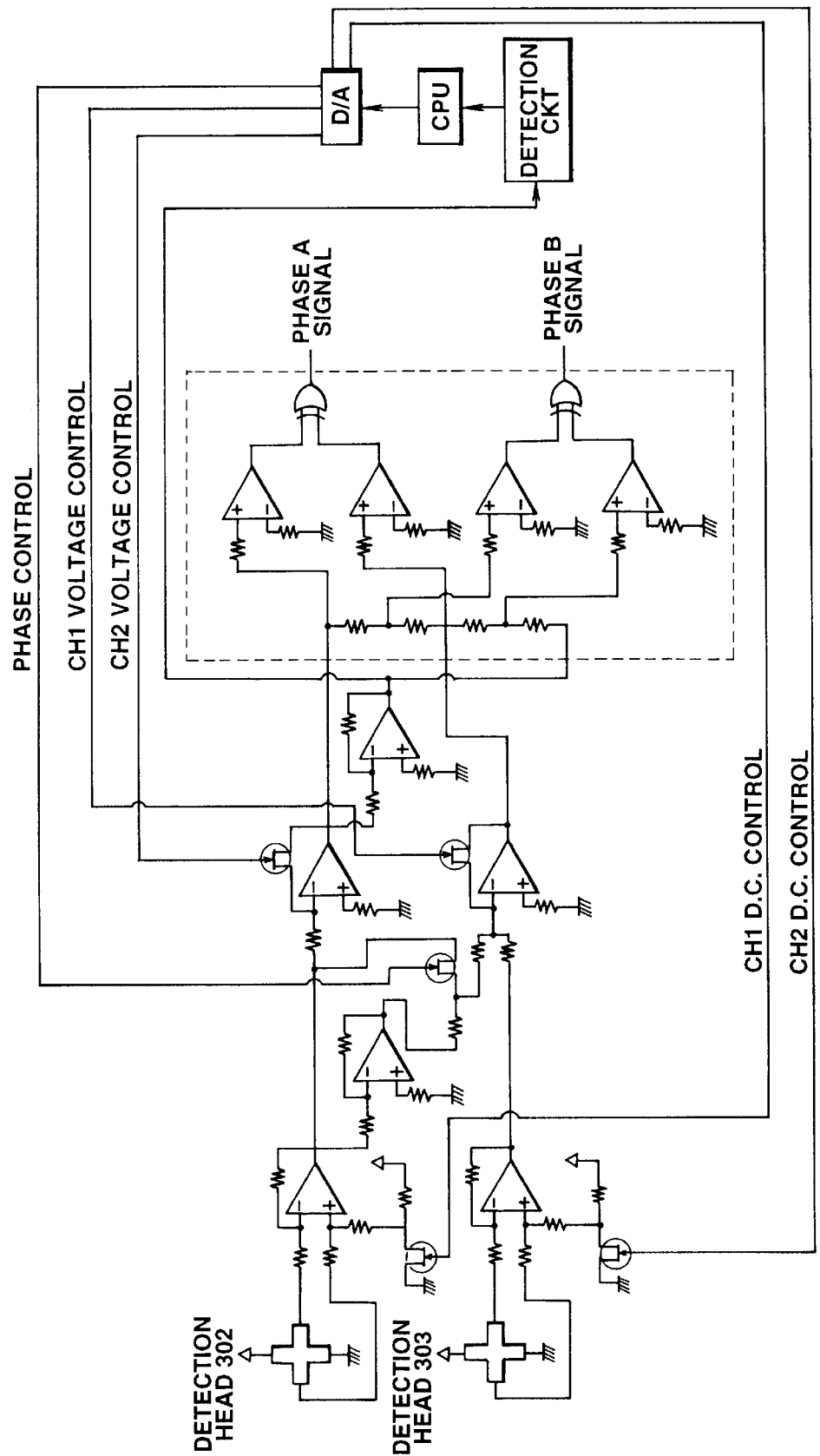
FIG. 10 is a circuit diagram which shows a whole construction of the displacement detecting apparatus according to the present invention.

When the zero-crossing points c, d, e and f and one of three pairs of the corresponded points g and h; h and i; i and j; or j and g shown in FIG. 3 are detected, the error amount of the direct-current component is calculated. According to the calculated error amount the correction of the electronic volume of the circuit shown in FIG. 10 is executed. In this situation, when the error amount of the direct-current component is smaller than an allowable value, the output voltage values A and B are calculated and corrected. Further, when the output voltage ratio is smaller than an allowable value, the phase amount is calculated and corrected.

FIG. 10 shows an example of an error correcting circuit of the displacement detecting apparatus according to the present invention. This circuit comprises a channel 1 (CH1) and a channel 2 (CH2) for the respective signals a and b detected by the detection heads 302 and 303. Each electronic volume at a first stage amplifier of each channel is arranged to receive a direct-current component control signal. Each electronic volume at a second stage amplifier of each channel is arranged to receive an output voltage control signal. An electronic volume of an impedance circuit between the channel 1 and the channel 2 receives a phase control signal.

Figure 11:
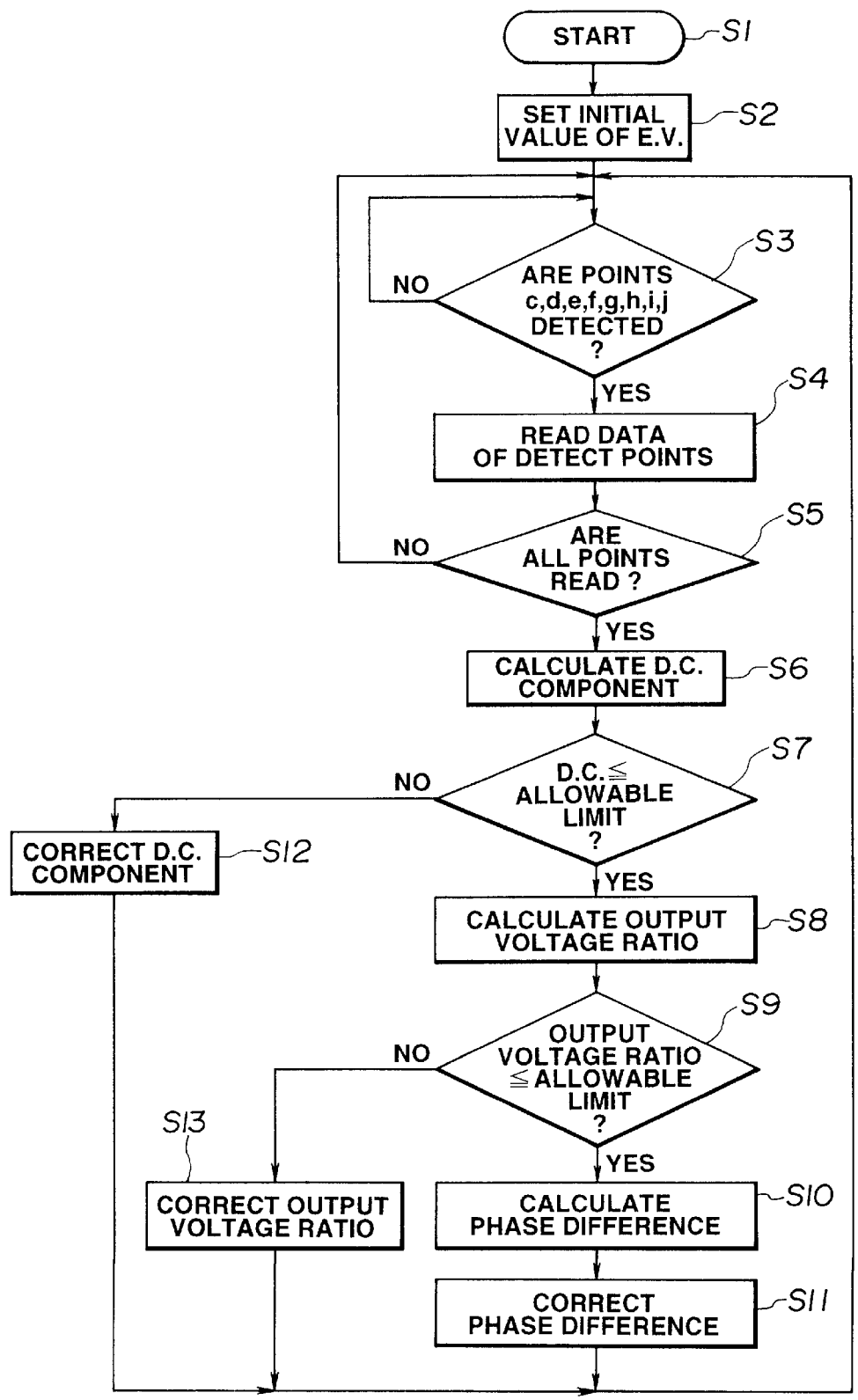
FIG. 11 is a flowchart showing a manner of an error correcting operation.

Next, the manner of the error correcting operation of the displacement detecting apparatus according to the present invention will be discussed hereinafter with reference to a flowchart of FIG. 11.

In a step S1, the routine is started.

In a step S2, an initial resistance value of an electronic volume (E.V.) is set at a predetermined value.

In a step S3, it is judged whether signal data at either of the detection points c, d, e, f, g, h, i, j is detected or not. When no data is detected, the routine repeats the step 3 until the data at either of detection points is detected. When the data at either of the detection points is detected, the routine proceeds to a step S4.

In the step S4, the detected data is stored in a memory.

In a step S5, it is judged whether the data at all of the detection points is obtained or not. When the data at either of the detection points is not yet obtained, the routine returns to the step S3 and repeats the steps S3, S4 and S5 until the YES answer is obtained in the step S5. When the data at all detection points is obtained, the routine proceeds to a step S6 wherein the direct-current component of each signal is calculated.

In a step S7, it is judged whether the calculated direct-current component is smaller than an allowable value or not. When the calculated direct-current component is not smaller than the allowable value, the routine jumps to a step S12 wherein the correction of the direct-current component is executed. When the direct-current component is smaller than the allowable value, the routine proceeds to a step S8 wherein the output voltage ratio is calculated.

In a step S9, it is judged whether the output voltage ratio is smaller than an allowable value or not. When the judgment in the step S9 is "NO", the routine jumps to a step S13 wherein the correction of the output voltage ratio is executed. When the judgment in the step S9 is "YES", the routine proceeds to a step S10 wherein the phase difference is calculated.

Following this, in a step S11, the correction of the phase difference is executed. After the execution of the step S11, the routine returns to the step S3.

Figure 2:
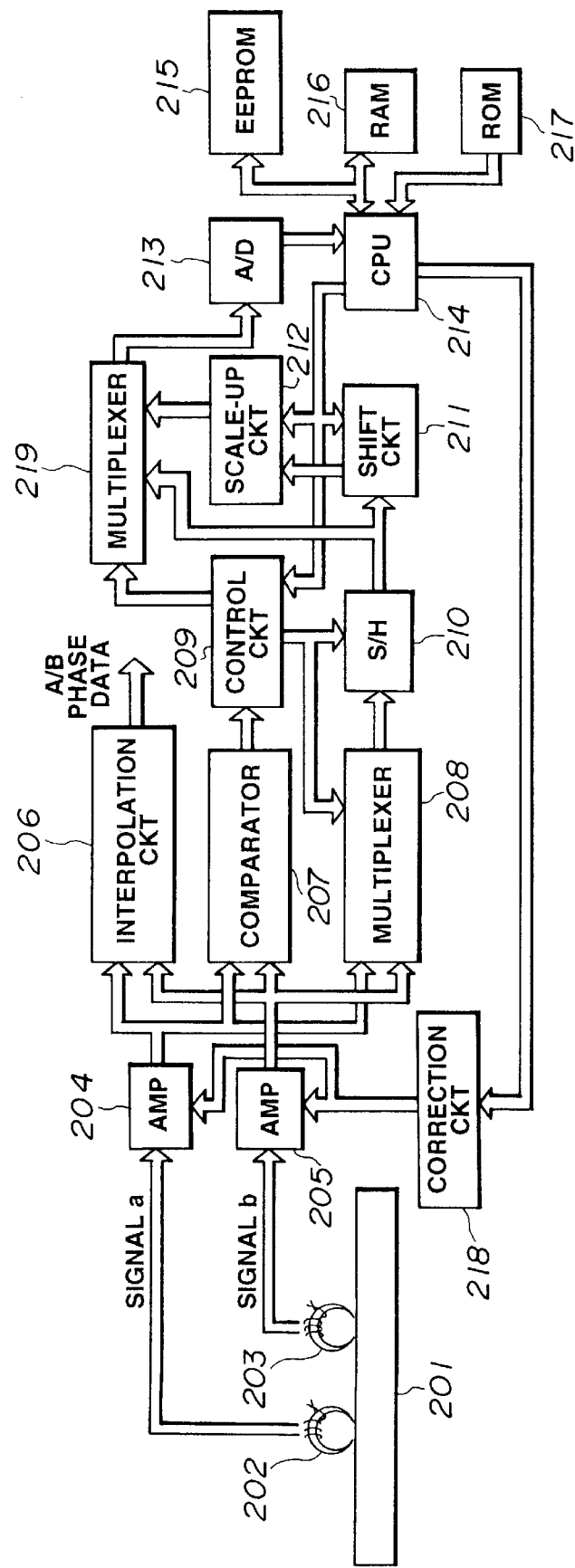
FIG. 2 is a block diagram showing another example of the correction circuit of the displacement detecting apparatus according to the present invention.

Referring to FIG. 2, there is shown a second embodiment of the displacement detecting apparatus according to the present invention. The structure of the second embodiment is generally similar to that of the first embodiment except that a multiplexer 219 is further added to the circuit of the second embodiment.

In case that the measuring scale 101 is put in a temperature outside of the predetermined range, or receives a dynamic impact larger than a predetermined value, it may happen that the scale signals a and b are largely deviated and therefore the input signal to the A/D converter 113 through the scale-up circuit 112 may take a large value outside of a predetermined range.

In contrast, according to the second embodiment, even if such signals are inputted in the apparatus, such signals are corrected without trouble. As shown in FIG. 2, the signals a and b detected by sensors 202 and 203 from a scale 201 is amplified at amplifiers (AMP) 204 and 205 at a necessary level. In the amplifiers 204 and 205, the direct-current component, the voltage ratio and the phase of the signals a and b are controlled according to a preset value stored in the EEPROM.

The amplified signals a and b in the amplifiers 204 and 205 are supplied to an interpolation circuit 206 wherein the signals are interpolated and an A/B phase signal is outputted. The amplified signals a and b are inputted to a comparator 207 wherein the signals are compared with a reference voltage for detecting a zero-crossing point and for detecting the absolute amount correspondence point of the sine-wave and cosine-wave of the signals. The circuit for detecting the zero-crossing point and the circuit for detecting the absolute amount correspondence point are shown in FIGS. 6 and 7, respectively.

The output indicative that the zero-crossing point and the absolute amount correspondence point are detected is inputted from the comparator 207 to a control circuit 209. The control circuit 209 outputs a control signal to a multiplexer 208 and a sample-and-hold circuit 210 so that the output signals from the amplifiers 204 and 205 at time when the zero-crossing point and the absolute amount correspondence point are detected are supplied to and stored in the sample-and-hold circuit 210 through the multiplexer 208.

The sample-and-hold signal is supplied to a shift circuit 211 wherein the signal is shifted so that the data in the vicinity of the detection point is outputted. The signal from the shift circuit 211 is supplied to a scale-up circuit 212 wherein the signal indicative of the data in the vicinity of the detection point is scaled up into a dynamic-range. Then, the scaled-up signal is supplied to an A/D converter 213. In case that the detected voltage (the signal supplied to the A/D converter) takes a value outside a range of the A/D converter 213, the sampled signal is not supplied to the scale-up circuit 212 and is supplied to the A/D converter 213 wherein the direct-current component and the gain of the signal is controlled in range so as to be within a range of the scale-up circuit.

Figure 12A:
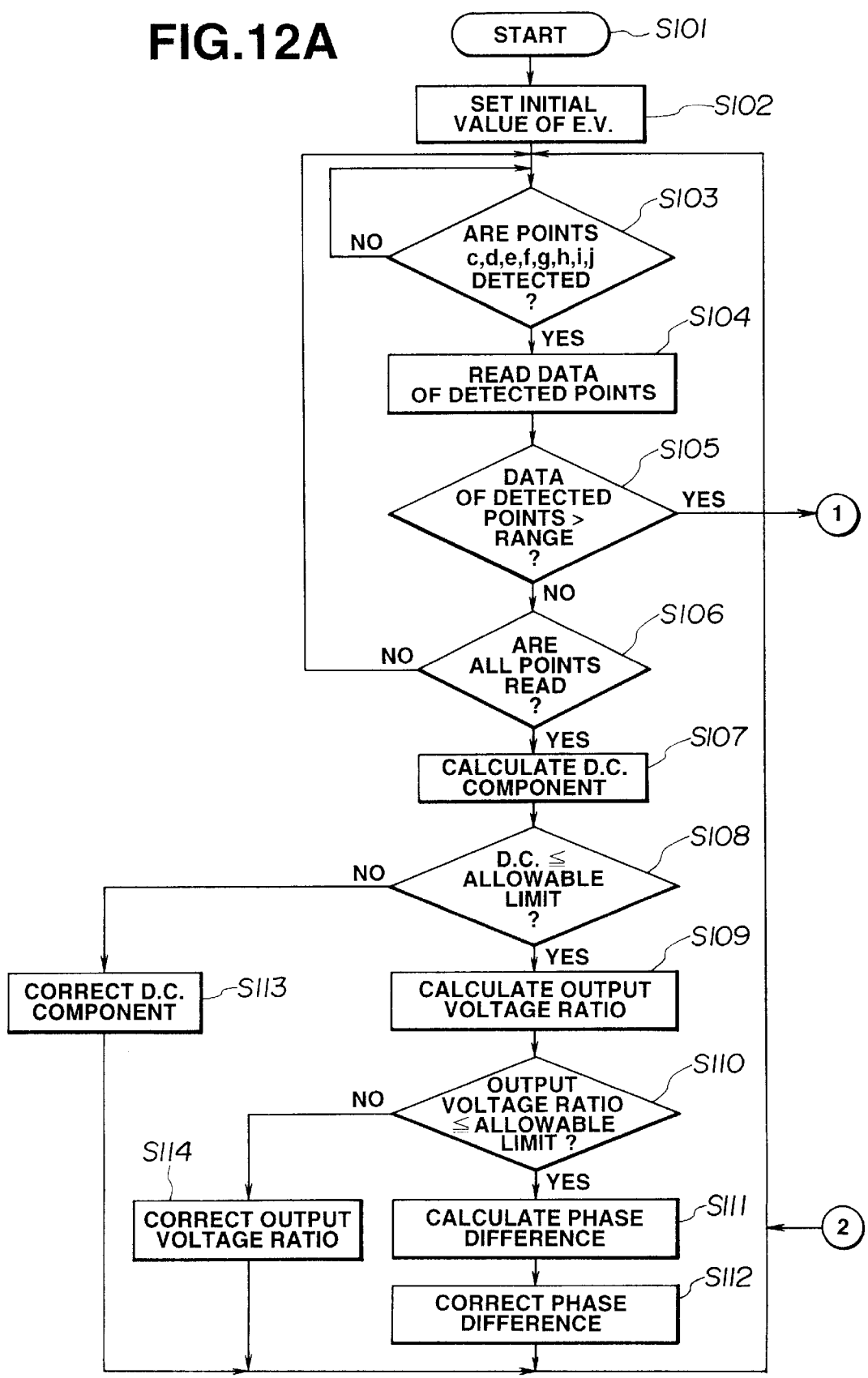
FIGS. 12A and 12B are flowcharts showing another manner of the error correcting operation.
Figure 12B:
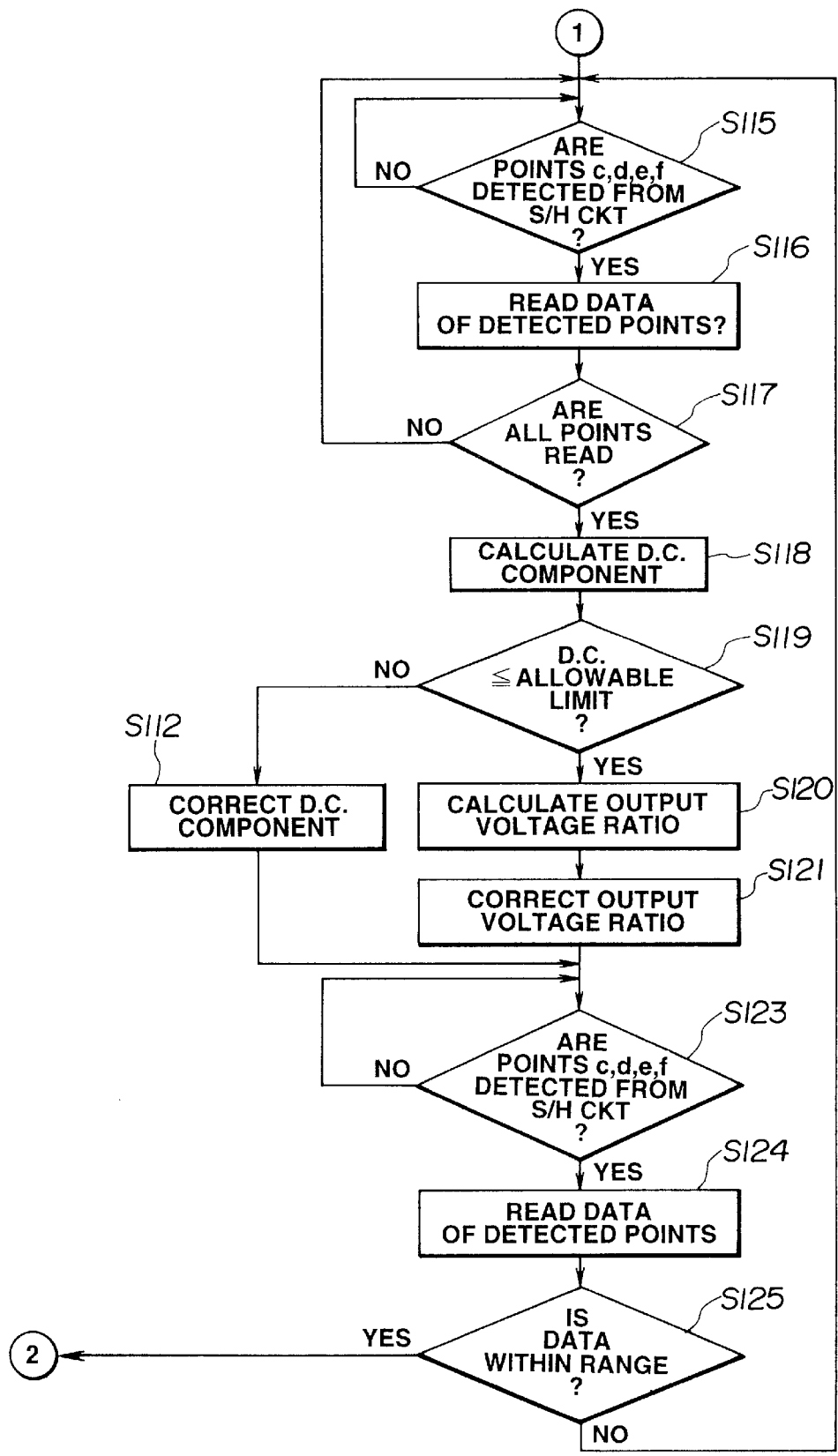

The manner of operation of the displacement detecting apparatus of the second embodiment will be discussed hereinafter with reference to flowcharts of FIGS. 12A and 12B.

In a step S101, the routine is started.

In a step S102, an initial resistance value of an electronic volume (E.V.) is set at a predetermined value.

In a step S103, it is judged whether signal data at either of the detection point c, d, e, f g, h, i, j is detected or not. When no data is detected, the routine repeats the step 103 until the data at either of the detection points is detected. When the data at either of the detection points is detected, the routine proceeds to a step S104.

In the step S104, the detected data is stored in a memory.

In a step S105, it is judged whether the detected data is outside of a predetermined range or not. When the detected data is within the range, the routine proceeds to a step S106. When it is outside the range, the routine proceeds to a step S115.

In a step S106, it is judged whether the data at all of the detection points is obtained or not. When the data at either of the detection points is not yet obtained, the routine returns to the step S103 and repeats the steps S103 to S106 until the YES answer is obtained in the step S106. When the data at all detection points is obtained, the routine proceeds to a step S107 wherein the direct-current component of each signal is calculated.

In a step S108, it is judged whether the calculated direct-current component is smaller than an allowable value or not. When the calculated direct-current component is not smaller than the allowable value, the routine jumps to a step S113 wherein the correction of the direct-current component is executed. When the direct-current component is smaller than the allowable value, the routine proceeds to a step S109 wherein the output voltage ratio is calculated.

In a step S110, it is judged whether the output voltage ratio is smaller than an allowable value or not. When the judgment in the step S110 is "NO", the routine proceeds to a step S114 wherein the correction of the output voltage ratio is executed. When the judgment in the step S110 is "YES", the routine proceeds to a step S111 wherein the phase difference is calculated.

Following this, in a step S112, the correction of the phase difference is executed. After the execution of the step S112, the routine returns to the step S103.

When the judgment in the step S105 is "YES", that is, when the detected data is out of the range, the routine proceeds to the step S115 wherein it is judged as to whether the data at the detection points c, d, e and f are detected by the sample-and-hold circuit 210 or not. When the judgment in the step S115 is "YES", the routine proceeds to a step S116 wherein the detected data is stored. When the judgment in the step S115 is "NO", the routine repeats the step S115 until the sample-and-hold circuit 210 detects the signal at the detection points c, d, e and f.

In a step S117, it is judged whether the data at all of the four detection points c, d, e and f is detected or not. When the judgement in the step S117 is "NO", the routine returns to the step S115 and repeats the steps S115, S116 and S117 until the data at all four points is detected. When the judgment in the step S117 is "YES", that is, when the data at all four detection points is detected, the routine proceeds to a step S118 wherein the direct-current component of each signal is calculated.

In a step S119, it is judged whether the calculated direct-current component is smaller than an allowable value or not. When the calculated direct-current component is not smaller than the allowable value, the routine proceeds to a step S122 wherein the correction of the direct-current component is executed. Following the step S122, the routine proceed to a step S123. When it is judged in the step S119 that the direct-current component is smaller than the allowable value, the routine proceeds to a step S120 wherein the output voltage ratio is calculated.

In a step S121, the correction of the output voltage is executed.

In a step S123, it is judged whether the data at the detection points c, d, e and f is detected by the sample-and-hold circuit 210 or not. When the judgment in the step S123 is "YES", the routine proceeds to a step S124 wherein the detected data is read-in and stored. When the judgment in the step S123 is "NO", the routine repeats the step S123 until the sample-and-hold circuit 210 detects the signal at the detection points c, d, e and f.

In the step S125, it is judged whether the detected data at the detection points c, d, e and f is within the range or not. When the judgment in the step S125 is "YES", the routine returns to the step S103. When the judgment in the step S125 is "NO", the routine returns to the step S115.

While the invention has been particularly shown and described with reference to preferred embodiments thereof, it will be understood by those skilled in the art that the forgoing and other changes in form and details can be made therein without departing from the spirit and scope of the invention.

What is claimed is:

1. A displacement detecting apparatus comprising:
 a detection head unit for detecting two sine wave signals whose phases are shifted by about 90°;
 a signal detecting circuit for detecting a magnitude of one of said two sine wave signals in analog form when the other one of said two sine wave signals crosses a reference voltage level, as to the respective sine wave signals;

an obtaining circuit for obtaining a correction amount of a direct current amount of the detected one of the two sine wave signals by said signal detecting circuit from an added value divided by two between two signal amounts that are detected at points crossing the reference voltage level and are located in different quadrants; and an adjusting circuit for adjusting the one of said two sine wave signals by the correction amount of the direct current component according to the detected correction amount.

2. A displacement detecting apparatus as claimed in claim 1, wherein said signal detecting circuit includes a single analog-to-digital converter and a multiplexer, wherein a plurality of sine wave signals are supplied to said analog-to-digital converter through said multiplexer.

3. A displacement detecting apparatus as claimed in claim 2, further comprising a scale-up circuit for scaling up data in the vicinity of the signal detected by said signal detecting circuit into a dynamic-range of the analog-to-digital converter.

4. A displacement detecting apparatus as claimed in claim 3, further comprising one of a micro-computer and a logic circuit for automatically controlling a setting of a scale-up ratio and an amplitude interval of the detected signal.

5. A displacement detecting apparatus as claimed in claim 4, wherein said detection head unit includes a pair of sensors for reading a position on a measuring scale.

6. A displacement detecting apparatus as claimed in claim 1, wherein said detection head unit includes a pair of sensors for reading a position on a measuring scale.

7. A displacement detecting apparatus as claimed in claim 1, wherein the signal detecting circuit further detects a direct current component of each of said two sine wave signals when said other one of said two sine wave signals crosses a reference voltage level;

and wherein said displacement detecting apparatus further comprises:

a determination circuit for determining whether an error amount of the detected direct current component is smaller than a predetermined value;

an obtaining circuit for obtaining a magnitude correction amount based on a first detected signal amount at the point where the one sine wave signal crosses the reference level and a second detected signal amount at the point where the other sine wave signal crosses the reference level; and an adjusting circuit for changing the magnitude of the two sine wave signals according to the magnitude correction amount.

8. A displacement detecting apparatus as claimed in claim 7, wherein said signal detecting circuit includes a single analog-to-digital converter and a multiplexer, wherein a plurality of sine wave signals are supplied to said analog-to-digital converter through said multiplexer.

9. A displacement detecting apparatus as claimed in claim 8, further comprising a scale-up circuit for scaling up data in the vicinity of the signal detected by said signal detecting circuit into a dynamic-range of the analog-to-digital converter.

10. A displacement detecting apparatus as claimed in claim 9, further comprising one of a micro-computer and a logic circuit for automatically controlling a setting of a scale-up ratio and an amplitude interval of the detected signal.

11. A displacement detecting apparatus as claimed in claim 10, wherein said detection head unit includes a pair of sensors for reading a position on a measuring scale.

12. A displacement detecting apparatus as claimed in claim 7, wherein the signal detecting circuit compares absolute values of the two sine wave signals in analog form and further detects a direct current component, an output voltage and a phase of each of the two sine wave signals when the absolute values are equal;

and wherein said displacement detecting apparatus further comprises:

a deciding circuit for deciding whether an error amount of the detected direct current component and an error amount of the detected output voltage ratio of the two sine wave signals are smaller than respective predetermined values;

an obtaining circuit for obtaining a phase correction amount of the phase from two signal amounts, which are detected when the absolute value of one of the two sine wave signals corresponds to that of the other of the two sine wave signals and are located at adjacent two quadrants, and when the error amount of the detected direct current component and the error amount of the output voltage ratio are smaller than the respective predetermined values; and an executing circuit for executing the correction of phase by correcting one of the sine wave signals with respect to the other of the two sine wave signals according to the phase correction amount.

13. A displacement detecting apparatus as claimed in claim 12, wherein said signal detecting circuit includes a single analog-to-digital converter and a multiplexer, wherein a plurality of sine wave signals are supplied to said analog-to-digital converter through said multiplexer.

14. A displacement detecting apparatus as claimed in claim 13, further comprising a scale-up circuit for scaling up data in the vicinity of the signal detected by said signal detecting circuit into a dynamic-range of the analog-to-digital converter.

15. A displacement detecting apparatus as claimed in claim 14, further comprising one of a micro-computer and a logic circuit for automatically controlling a setting of a scale-up ratio and an amplitude interval of the detected signal.

16. A displacement detecting apparatus as claimed in claim 15, wherein said detection head unit includes a pair of sensors for reading a position on a measuring scale.

17. A displacement detecting apparatus as claimed in claim 12, wherein said detection head unit includes a pair of sensors for reading a position on a measuring scale.

18. A displacement detecting apparatus as claimed in claim 7, wherein said detection head unit includes a pair of sensors for reading a position on a measuring scale.

19. A displacement detecting apparatus as claimed in claim 1, further comprising:

a generating circuit for generating signals which are the two sine wave signals detected by said detection head unit and signals obtained by shifting and amplifying the two sine wave signals, said generating circuit supplying the generated signals to an A/D converter through a multiplexer.

20. A displacement detecting apparatus comprising:

a detection head unit for detecting two sine wave signals, whose phases are shifted by about 90°;

a signal detecting circuit for comparing absolute values of the two sine wave signals in analog form, wherein said signal detecting circuit detects a direct current component, an output voltage, and a phase of each of the two sine wave signals when the absolute values are equal;

a deciding circuit for deciding whether an error amount of the detected direct current component and an error amount of an output voltage ratio of the detected output voltages of the two sine wave signals are smaller than respective predetermined values;

an obtaining circuit for obtaining a phase correction amount of the phase from two signal amounts, which are detected when the absolute value of one of the two sine wave signals corresponds to that of the other of the two sine wave signals and are located at adjacent two quadrants, and when the error amount of the detected direct current component and the error amount of the output voltage ratio are smaller than the respective predetermined values; and an executing circuit for executing the correction of phase by correcting one of the sine wave signals with respect to the other of the two sine wave signals according to the phase correction amount.

21. A displacement detecting apparatus as claimed in claim 20, wherein said signal detecting circuit includes a single analog-to-digital converter and a multiplexer, wherein a plurality of sine wave signals are supplied to said analog-to-digital converter through said multiplexer.

22. A displacement detecting apparatus as claimed in claim 21, further comprising a scale-up circuit for selecting a predetermined interval of the sine wave signals and for scaling up the magnitudes of the sine wave signals within the predetermined interval so that the amplitude interval of the scaled-up magnitude becomes equal to a dynamic range of said A/D converter, and for supplying the scaled-up signal magnitudes to said A/D converter.

23. A displacement detecting apparatus as claimed in claim 22, further comprising one of a micro-computer and a logic circuit for automatically controlling a setting of a scale-up ratio and an amplitude interval of the detected signal.

24. A displacement detecting apparatus as claimed in claim 23, wherein said detection head unit includes a pair of sensors for reading a position on a measuring scale.

25. A displacement detecting apparatus as claimed in claim 20, further comprising an A/D converter, and a scale-up circuit for selecting a predetermined interval of the sine wave signals and for scaling up the magnitudes of the sine wave signals within the predetermined interval so that the amplitude interval of the scaled-up magnitude becomes equal to a dynamic range of said A/D converter, and for supplying the scaled-up signal magnitudes to said A/D converter.

26. A displacement detecting apparatus as claimed in claim 25, further comprising one of a micro-computer and a logic circuit for automatically controlling a setting of a scale-up ratio and an amplitude interval of the detected signals.

27. A displacement detecting apparatus as claimed in claim 20, further comprising one of a micro-computer and a logic circuit for automatically controlling a setting of a scale-up ratio and an amplitude interval of the detected signals.

* * * * *